United States Patent [19]

Head, Jr.

[11] Patent Number: 4,483,132
[45] Date of Patent: Nov. 20, 1984

[54] COTTON PICKER SPINDLE
[75] Inventor: Glenn D. Head, Jr., Des Moines, Iowa
[73] Assignee: Deere & Company, Moline, Ill.
[21] Appl. No.: 465,982
[22] Filed: Feb. 14, 1983
[51] Int. Cl.³ .............. A01D 46/16; A01D 46/08
[52] U.S. Cl. ........................................ 56/50; 56/41
[58] Field of Search .................. 56/50, 41–47; 428/450, 325

[56] References Cited

U.S. PATENT DOCUMENTS

| | | | |
|---|---|---|---|
| 2,837,886 | 6/1958 | Beach et al. | 56/50 |
| 2,929,189 | 3/1960 | Oshatz et al. | 56/50 |
| 3,606,746 | 9/1971 | Hayward | 56/50 |
| 3,875,971 | 4/1975 | Hamling | 428/450 |
| 4,105,821 | 8/1978 | Blaich et al. | 428/450 |
| 4,308,315 | 12/1981 | Frye | 428/450 |
| 4,379,196 | 4/1983 | Halper | 428/450 |
| 4,411,960 | 10/1983 | Mizuhara | 428/450 |

FOREIGN PATENT DOCUMENTS 824911 4/1981 U.S.S.R. .................. 56/50

Primary Examiner—Gene Mancene
Assistant Examiner—John G. Weiss

[57] ABSTRACT

A cotton picker spindle having a thin ceramic coating for increased smoothness and hardness.

16 Claims, 4 Drawing Figures

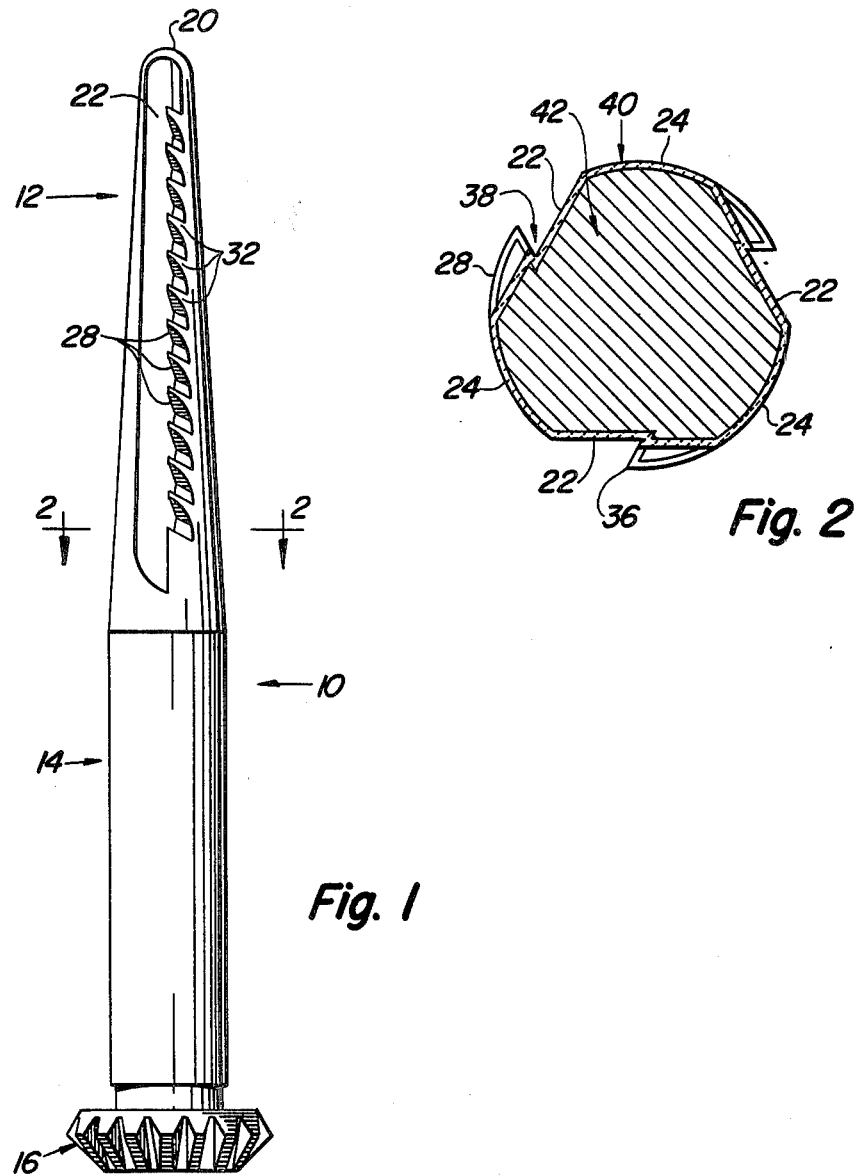

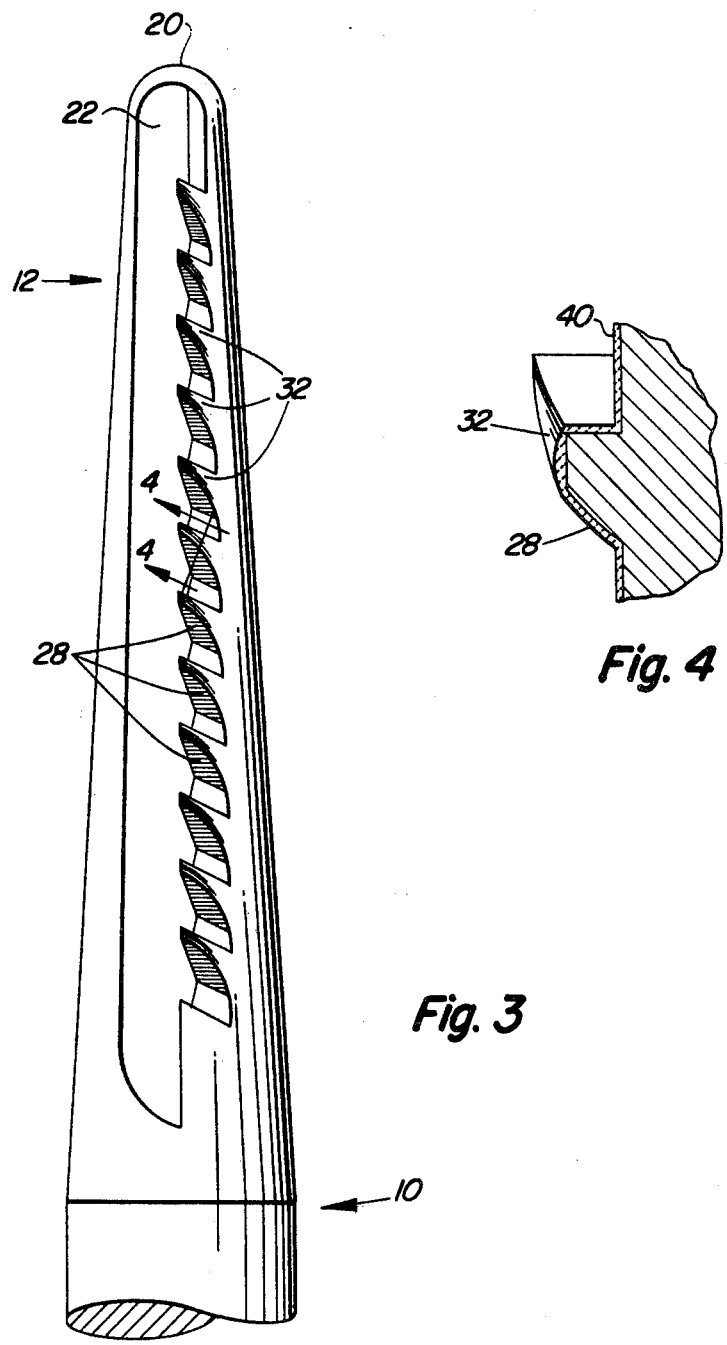

COTTON PICKER SPINDLE

BACKGROUND OF THE INVENTION

The present invention relates to cotton picker spindles having a ceramic coating for increased hardness and smoothness.

A typical cotton picker includes a plurality of rotating barbed spindles which project into the plants to remove the cotton therefrom. A picker drum assembly includes a plurality of vertical picker bars which each support a column of rotatable picker spindles extending horizontally. Each spindle is elongated and includes a drive gear which is driven to rotate the spindle about its principle axis as the barbs engage the cotton. The cotton wraps around the spindles and is doffed therefrom by a doffing mechanism which includes a plurality of rubber doffers, one for each row of picking spindles.

A typical cotton picker spindle is fabricated from special heat-treated steel which is chrome plated to provide a hard, smooth surface. Several problems exist with these types of spindles typical of the prior art. Frost or rough spots can build on the spindle as the chrome plating is being carried out. Such irregularities must be finished out to prevent cotton from sticking to the spindles or the cotton will not doff properly and will be thrown back into the rows out of the harvesting compartment. Such a finishing process requires an additional step during manufacturing, and if the frost or irregularities are not removed, the spindle can be totally ineffective for harvesting cotton. Since a spindle is subjected to constant wear in a hostile environment, the useful life of the spindle is often less than desired even with the hard chrome plating. When the spindle is subjected to sand, which is much harder than the chrome plating, wear is accelerated. Replacing spindles is a time-consuming and expensive task, and reduces the productivity of the cotton harvester.

It is therefore an object of the present invention to provide an improved cotton picker spindle.

It is a further object of the invention to provide an improved cotton picker spindle which has an increased life expectancy as compared with at least most other prior art cotton picker spindles.

It is another object of the invention to provide a cotton picker spindle which has a smoother and harder surface than most prior art spindles. It is yet another object to provide such a spindle which does not require a finishing step during manufacture and which is yet devoid of frost or other irregularities which would result in inefficient picking and doffing of the cotton.

It is yet another object of the invention to provide a cotton picker spindle which is less expensive to manufacture than at least some prior art types of cotton picker spindles and yet has a smoother and harder surface than those prior art spindles.

In accordance with the above objects, a cotton picker spindle is provided with an elongated conical body made of hard metal and having a cone-shaped toothed picking end coated with a very thin coat of ceramic material. The ceramic material, preferably silica chrome alumina oxide or equivalent, coats the entire picking end including the teeth or barbs and the tip, and provides a very smooth, extremely hard surface which does not require finishing and which wears longer than conventional picker spindle surfaces. The ceramic coating can have a hardness greater than that of sand so that the spindle will wear much longer than a conventional spindle in sandy conditions. In one embodiment the entire picker spindle, including the cylindrical journal portion and the drive gear, is coated with a thin layer of ceramic. In an alternate embodiment, only the conical picking end has a ceramic coating. Although the coating is substantially uniform, a slight rounding effect on the top of the teeth or barbs is believed to provide better tooth wear and more advantageous hooking and better doffing action.

These and other objects, features and advantages of the present invention will become apparent to those skilled in the art from the description which follows and from the drawings.

BRIEF DESCRIPTION OF THE DRAWINGS

FIG. 1 is an enlarged elevational view of the improved spindle.

FIG. 2 is a sectional view of the spindle taken along lines 2—2 of FIG. 1 and showing the ceramic coating, with thickness exaggerated for clarity.

FIG. 3 is an enlarged view of the cone-shaped end of the spindle of FIG. 1.

FIG. 4 is a view taken along lines 4—4 of FIG. 3 and showing the rounding effect of the coating on the top of the teeth.

DESCRIPTION OF THE PREFERRED EMBODIMENT

The cotton picker spindle, indicated generally at 10, includes a cone-shaped picking end 12, a cylindrical barrel or journal portion 14 adapted to be rotated within a bushing supported on the vertical picker bar (not shown), and a drive gear 16 formed in the end of the spindle opposite the picking end 12.

The cone-shaped picking end 12 includes a rounded tip portion 20 and is provided with alternating flutes 22 and lands 24 running lengthwise of the spindle 10. Preferably three flutes 22 are provided and are equally spaced about the periphery of the picking end 12. The flutes 22 are flattened and lie radially inwardly of the rounded lands 24. A plurality of teeth or barbs 28 project over the flutes 22 and include upper, somewhat flattened surfaces 32 which lie generally along the surface of the cone described by the continuation of the lands 24. The barbs 28 include pointed tip portions 36 lying generally on the conical surface continued through the lands 24. The teeth or barbs 28 are undercut somewhat at locations 38 for aggressive engagement of the barbs in the cotton. The overall shape and general function of the picker spindle 10 is generally the same as commercially available prior art picker spindles, such as utilized on the John Deere 9940 cotton picker, and therefore will not be described in further detail herein.

As best seen in FIG. 2, the entire cone-shaped picking end 12 is coated with a layer of ceramic material indicated generally at 40. Preferably the ceramic coating 40 is very thin as compared with the dimensions of the barbs 28 so that the effective shape of the picking end 12 remains relatively unaltered. In the preferred embodiment, the ceramic coating 40 is fabricated from silica chrome alumina oxide and is on the order of 0.001 to 0.002 inches thick. Also, in the preferred embodiment, the entire spindle 10 including the cylindrical journal portion 14 and the gear 16 is covered with the thin layer of ceramic material 40. By coating the journal area 14 and the gear 16, a hard wear surface is provided for extending the life of these elements. In an alternate embodiment, only the cone-shaped picking end 12 is covered with the thin layer of ceramic material 40.

The main body portion of the spindle 10, indicated generally at 42 in FIG. 2, is preferably a fine grain, hard steel. The ceramic coating 40 is preferably SCA K-ramic ® applied by a ceramic treating process available through Kaman Sciences Corporation, Colorado Springs, Colorado. A very long-wearing, hard and smooth surface is provided which increases the life expectancy and picking efficiency of the spindle 10. A ceramic hardness of Vickers 700 minimum on the journal portion 14 and the gear 16, and a ceramic hardness of Vickers 700 to 3000 on the picking end 12 are preferred. Sand has a hardness on the order of Vickers 1200, and a higher value, for example 1800, on the ceramic coating will increase life expectancy of the spindle in sandy conditions. When the barrel 14 and gear 16 are coated, the maximum preferred thickness on the barrel and gear is about 0.0005 inches. In the preferred embodiment a finishing step is eliminated, but the coated spindle can be polished to achieve even a greater degree of smoothness.

Although the overall shape of the cone-shaped picking end 12 remains substantially the same after the coating 40 is applied, the upper flat portions 32 of the barbs 28 become slightly rounded (FIG. 4) as the coating 40 thickens slightly in the center with respect to the edges of the flats 32. This slight rounding effect is believed to be advantageous for increasing the life of the barbs and the doffability of the picking end 12. The undercut areas 38 become slightly rounded rather than being abrupt, but this has no noticeable adverse affect on spindle operation.

Having described the preferred embodiment, it will be apparent that modifications can be made without departing from the scope of the invention as defined in the accompanying claims.

I claim:

1. In a cotton picker spindle having an elongated, tapered picking end of unitary construction and rotatable about its principle axis, said spindle including a plurality of teeth projecting in the direction of rotation and including upper, somewhat flattened surfaces, the improvement comprising: a smooth, thin ceramic wear coating covering substantially the entire picking end, said ceramic coating having a greater thickness on the flattened surfaces and defining therewith hook-like structure for improved picking and doffing and increased tooth life.

2. The invention as set forth in claim 1 wherein the ceramic coating is on the order of 0.001 to 0.002 inches in thickness.

3. The invention as set forth in claim 1 wherein the ceramic wear coating covers the entire picker spindle.

4. The invention as set forth in claim 1 wherein the ceramic wear coating has a ceramic hardness on the order of Vickers 700 to 3000.

5. The invention as set forth in claim 1 wherein the picker spindle includes a drive gear and the drive gear includes a thin ceramic wear coating.

6. The invention as set forth in claim 5 wherein the thickness of the ceramic coating on the gear is on the order of 0.0005 inches.

7. The invention as set forth in claim 1 wherein the picker spindle includes a steel base and wherein the thin ceramic wear coating is bonded to the steel base.

8. The invention as set forth in claim 1 wherein the spindle includes a journal area, the improvement further comprising a ceramic wear coating on the journal area.

9. The invention as set forth in claim 8 wherein the journal area is coated with a ceramic coating on the order of 0.0005 inches in thickness.

10. The invention as set forth in claim 1 wherein the wear coating comprises silica chrome alumina oxide.

11. The invention as set forth in claim 1 wherein the ceramic coating is slightly thicker at center of the flattened surfaces to provide a rounding effect on said surfaces.

12. In a cotton picker spindle having an elongated, generally cone-shaped picking end rotatable about its principle axis, a plurality of flutes and lands spaced alternately around the periphery of the end, and a plurality of teeth projecting over the flutes, said teeth including upper, somewhat flattened and relatively narrow surfaces which lie generally along the surface of the cone, said flattened surfaces terminating in edges, the improvement comprising: a smooth ceramic coating uniformly covering substantially the entire picking end including the teeth so that the effective shape of the picking end remains relatively unaltered, said ceramic coating having a thickness slightly greater near the center of the flattened surfaces than near the edges to provide a rounding effect on said surfaces for increased tooth life and doffability.

13. The invention as set forth in claim 12 wherein the coating comprises a layer of ceramic on the order of 0.001 to 0.002 inches in thickness.

14. The invention as set forth in claim 12 wherein the ceramic coating has a hardness greater than Vickers 1200.

15. The invention as set forth in claim 12 wherein the picking end is fabricated from hard steel and the ceramic coating is bonded to the steel.

16. The invention as set forth in claim 12 wherein the entire picker spindle is coated with a thin layer of ceramic.

* * * * *